United States Patent
Gabriel et al.

(10) Patent No.: US 11,664,974 B2
(45) Date of Patent: *May 30, 2023

(54) SUMMARY CHAINS IN DISTRIBUTED SYSTEMS

(71) Applicant: INTUIT INC., Mountain View, CA (US)

(72) Inventors: Michael R. Gabriel, Mountain View, CA (US); Glenn Scott, Mountain View, CA (US)

(73) Assignee: INTUTI, INC., Mountain View, CA (US)

( * ) Notice: Subject to any disclaimer, the term of this patent is extended or adjusted under 35 U.S.C. 154(b) by 337 days.

This patent is subject to a terminal disclaimer.

(21) Appl. No.: 17/083,418

(22) Filed: Oct. 29, 2020

(65) Prior Publication Data
US 2021/0044423 A1     Feb. 11, 2021

Related U.S. Application Data

(63) Continuation of application No. 15/909,266, filed on Mar. 1, 2018, now Pat. No. 10,855,445.

(51) Int. Cl.
| H04L 9/06 | (2006.01) |
| H04L 9/00 | (2022.01) |
| H04L 9/32 | (2006.01) |

(52) U.S. Cl.
CPC .......... H04L 9/0637 (2013.01); H04L 9/0643 (2013.01); H04L 9/50 (2022.05)

(58) Field of Classification Search
CPC .. H04L 9/0637; H04L 9/0643; H04L 2209/38
USPC ......................................................... 380/28
See application file for complete search history.

(56) References Cited

U.S. PATENT DOCUMENTS

| 2005/0004899 A1 | 1/2005 | Baldwin et al. |
| 2010/0064166 A1 | 3/2010 | Dubnicki et al. |
| 2016/0027229 A1 | 1/2016 | Spanos et al. |
| 2017/0193464 A1 | 7/2017 | Sher |

(Continued)

FOREIGN PATENT DOCUMENTS

| KR | 101701131 B1 | 2/2017 |
| KR | 101727525 B1 | 4/2017 |

OTHER PUBLICATIONS

Ahto Buldas; A Blockchain-Assisted Hash-Based Signature Scheme; Sprionger:2018; pp. 1-16.*

(Continued)

*Primary Examiner* — Monjur Rahim
(74) *Attorney, Agent, or Firm* — Patterson + Sheridan, LLP

(57) ABSTRACT

Certain aspects of the present disclosure provide techniques for summarizing data in a distributed system. Embodiments include generating an ordered list of blocks by iterating through a first group of blocks of a hash chain starting at a last block of the hash chain and adding each of the first group of blocks of the hash chain to the ordered list. Embodiments further include generating summary data by applying a summary function to the first group of blocks based on the ordered list. The summary function may take the ordered list as an input and provide the summary data of the first group of blocks as an output. Embodiments further include generating a summary block comprising the summary data and adding the summary block to a summary chain.

17 Claims, 7 Drawing Sheets

(56) References Cited

U.S. PATENT DOCUMENTS

2018/0102013 A1    4/2018  Spanos et al.
2019/0122208 A1    4/2019  Richardson

OTHER PUBLICATIONS

H. Hermanns: Stochastic Process Algebras—Between LOTOS and Markov Chains: Elsevier: 1998I p. 1-24.
International Search Report/Written Opinion issued to PCT/US2019/014456 dated May 10, 2019.

* cited by examiner

SUMMARY CHAINS IN DISTRIBUTED SYSTEMS

CROSS-REFERENCE TO RELATED APPLICATIONS

This application is a continuation of and hereby claims priority under 35 U.S.C. § 120 to pending U.S. patent application Ser. No. 15/909,266, filed on Mar. 1, 2018, the contents of which are incorporated herein in their entirety.

INTRODUCTION

Aspects of the present disclosure generally relate to summarizing data in distributed systems. In particular, embodiments of the present disclosure involve generating summary chains of data stored in hash chains.

BACKGROUND

Distributed systems may comprise hash chains (e.g., blockchains), which are data structures that record data in a fashion analogous to a chain. Each update to the chain creates a new block containing the data and each block is linked to the previous block by a cryptographic function. Blocks are generally appended to the end of the chain and, once in the chain, resist modification so that the cryptographic links in the chain are preserved. Entities (e.g., applications) that receive data from blocks of the chain may check the cryptographic links to test the validity of the chain. Any modification of a block is detected and subject to remedial or other action. Hash chains are generally managed by peer-to-peer networks, which collectively adhere to an established protocol for validating each new block and are designed to be inherently resistant to modification of data. Once recorded, the data in any given block cannot be modified without the alteration of subsequent blocks and the involvement of the network.

Hash chains are useful for storing and managing data related to systems in which maintaining secure and consistent records is important for auditing purposes. For example, accounting systems may be implemented using hash chains. In such an implementation, accounting events are recorded in blocks on the chain over time. A hash chain may, for example, include a detailed accounting history of the state of a transaction. Verification and auditing of an accounting system on a hash chain may therefore be performed by visiting each block of the chain and verifying the data in real time. However, because the size of hash chains may grow indefinitely due to the modification-resistant nature of hash chains, verifying and auditing an accounting system stored on a hash chain can take an increasingly large amount of time and resources. As such, there is a need for improved techniques of verifying and auditing data stored on hash chains.

BRIEF SUMMARY

Certain embodiments provide a method for summarizing data in a distributed system. The method generally includes generating an ordered list of blocks by: iterating through a first group of blocks of a hash chain starting at a last block of the hash chain; and adding each of the first group of blocks of the hash chain to the ordered list. The method further includes generating summary data by applying a summary function to the first group of blocks based on the ordered list, wherein the summary function takes the ordered list as an input and provides the summary data of the first group of blocks as an output. The method further includes generating a summary block comprising the summary data and adding the summary block to a summary chain.

Other embodiments provide a system comprising a processor and a non-transitory computer-readable medium storing instructions that, when executed by the processor, cause the processor to perform an operation for summarizing data in a distributed system. The operation generally includes generating an ordered list of blocks by: iterating through a first group of blocks of a hash chain starting at a last block of the hash chain; and adding each of the first group of blocks of the hash chain to the ordered list. The operation further includes generating summary data by applying a summary function to the first group of blocks based on the ordered list, wherein the summary function takes the ordered list as an input and provides the summary data of the first group of blocks as an output. The operation further includes generating a summary block comprising the summary data and adding the summary block to a summary chain.

Other embodiments provide a non-transitory computer-readable medium storing instructions that, when executed by the processor, cause the processor to perform an operation for summarizing data in a distributed system. The operation generally includes generating an ordered list of blocks by: iterating through a first group of blocks of a hash chain starting at a last block of the hash chain; and adding each of the first group of blocks of the hash chain to the ordered list. The operation further includes generating summary data by applying a summary function to the first group of blocks based on the ordered list, wherein the summary function takes the ordered list as an input and provides the summary data of the first group of blocks as an output. The operation further includes generating a summary block comprising the summary data and adding the summary block to a summary chain.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
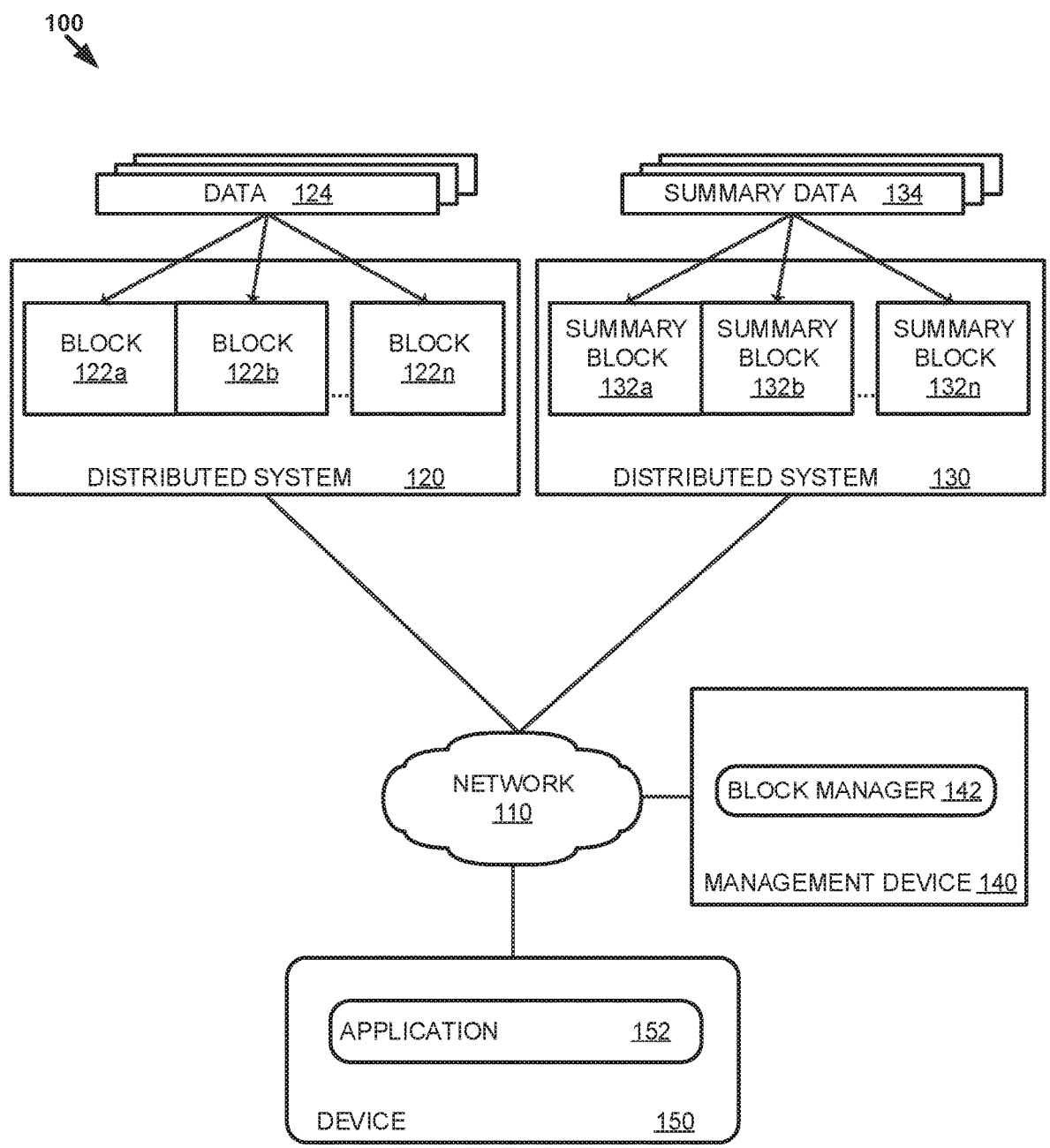
FIG. 1 depicts an example computing environment in which embodiments of the present disclosure may be implemented.

Aspects of the present disclosure provide apparatuses, methods, processing systems, and computer readable mediums for summarizing data in hash chains.

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

In certain embodiments, a hash chain comprising one or more blocks may be maintained in a distributed system. A block on the hash chain may generally comprise a payload with data (e.g., data associated with an application), as well as header information comprising a hash of the data and a pointer to the previous block on the chain (if there is a previous block on the chain). In some embodiments, the hash may serve as an identifier for the block. When new data is added to the chain, a new block comprising the new data may be added to the tail of the chain. The tail generally refers to the end of the chain.

Because blocks on the chain are resistant to change or removal, the size of the chain may continue to grow indefinitely. As such, techniques described herein allow for periodic summarization of data on the chain, thereby allowing for more efficient analysis, verification, and auditing of the data. For example, a summary period may be defined such that a summary operation is performed every time the summary period has elapsed. A summary period may, for example, comprise a length of time (e.g., hours, days, weeks, or the like), a number of blocks added to the chain, an amount of data added to the chain, a value reached by a variable of the data (e.g., every so many dollars of sales), or the like. Once the summary period has elapsed (e.g., when a summary threshold is reached), a management entity associated with the chain may perform a summary operation. For example, a block manager may apply a summary function to blocks that were added to the chain during the summary period (e.g., since the last summary threshold was reached, since the beginning of the chain, or the like).

A summary function may take an ordered list of blocks as an input and return summary data as an output. For example, a summary function may comprise a summation of values within the data, a net change in values within the data during the summary period, a balance calculation, or the like. In one example, a summary function provides a summation of accounting-related data stored in the blocks. Accounting-related data may, for example, comprise data related to expenses, income, sales, returns, and the like. The block manager may generate an ordered list by iterating through the blocks on the chain starting with the tail and ending at the beginning of the summary period or the beginning of the chain, and provide the ordered list as input to the summary function. The block manager may then store the results of the summary function in a summary block and add the summary block to the tail of a summary chain.

The block manager may continue to apply the summary function to new blocks every time the summary period elapses, and may continue to add summary blocks to the summary chain. Each summary block may store a hash of the last block summarized from the hash chain. For example, when the block manager generates the ordered list, it may determine the hash of the block that comprises the tail of the hash chain at the time, and may store that hash in the summary block after applying the summary function. During each periodic summary operation, the block manager may use the hash stored in the last summary block to identify the last block that was summarized on the hash chain to avoid redundant summarization.

In some embodiments, the summary function may take the blocks and add them in reverse order to a new hash chain. This may be useful for auditing of accounting-related data due to the fact that data on hash chains is accessed starting at the end of the chain and moving towards the beginning of the chain. If accounting-related data is included in blocks ordered sequentially on a chain, the data would be accessed in the reverse order from that in which it occurred (e.g., because transactional data is added to the chain sequentially but accessed in reverse from the end of the chain), and this may make it difficult to maintain an accurate summation or balance of values such as expenses or sales. As such, placing the accounting-related data in reverse order on a new chain may solve this problem so that data is accessed from the chain in the order in which it occurred. The new chain may then be stored within a summary block, which may then be added to the end of a summary chain. As such, the summary chain may comprise a sequence of blocks representing sets of periodic data in reverse order on chains. In some embodiments, blocks on a hash chain may simply be added to a new "periodic" chain in reverse order without performing any other operations related to summarization. For example, a periodic chain may be generated that comprises blocks that were added to a hash chain during a particular period (e.g., time interval, number of blocks, or the like) in reverse order, thereby allowing for transactional data to be retrieved in sequential order starting at the tail of the periodic chain.

Techniques described herein allow for efficient and effective auditing or analysis of data. For example, rather than traversing the entire hash chain to retrieve all data each time an audit is performed, a summary chain allows for retrieving summary data representing summaries of different periods, and the summary data may be used to quickly make determinations. Analysis may refer to any type of evaluation of data (e.g., statistical analysis, general calculations, and the like), whereas auditing generally refers to activities related to verification and error-checking. In certain embodiments, if the summary data proves insufficient for a particular analysis or audit being performed, the full hash chain may be accessed. For example, if a particular audit requires looking at data related to investment related income while the summary block only includes a summation of total income, the full hash chain may need to be accessed in order to retrieve the additional data. Alternatively, embodiments of the present disclosure may involve storing the blocks of a hash chain in reverse order on a new chain and performing analysis or auditing of the data using the new chain. Reversing an order of blocks may be performed independently of other techniques described herein, such as the use of summary periods, summary functions, summary blocks, and summary chains.

In some embodiments, the summary chain may store summary blocks containing summary data from a plurality of hash chains. In these embodiments, summary blocks may indicate the hash chains from which they originated. In an example, a summary chain may comprise summary blocks from a plurality of hash chains associated with different individual franchises of a corporation. The corporation may use the summary chain to perform regular analysis or audits of accounting-related data from all of its franchises, and may consult the full hash chains for the individual franchises only when additional data is needed.

Techniques described herein may provide benefits that are in some ways analogous to those provided by the conventional practice of double entry accounting. In conventional double entry accounting, daybooks are generally used to record individual transactions during the day. A daybook is considered the book of prime entry. At some checkpoint, often daily, the entries in a daybook are summarized and recorded in a nominal ledger. The summary information in the nominal ledger is more compact than the entries in the daybook, and allows for quicker verification of the entries. Similarly, summary chains according to embodiments of the present disclosure allow for efficient verification and auditing of accounting data stored on a hash chain.

While the present disclosure includes discussion of embodiments involving accounting-related data, it is understood that techniques described herein are applicable to other types of data as well. For example, many types of data may be summarized using statistical algorithms. User data, such as profile information, clickstream data, application context information, and the like, may be summarized through grouping and correlation of features. As such, summary functions may involve metric analysis and statistical summarization of data.

Embodiments of the present disclosure constitute an improvement over existing techniques for maintaining data in hash chains, as they reduce the usage of processing and memory resources for accessing, analyzing, and auditing data stored is hash chains. Performing periodic summarization of data stored on a hash chain and storing the periodic summary data on a summary chain allows for the data to be effectively analyzed or audited on the summary chain without requiring traversal of the entire hash chain. Furthermore, techniques described herein allow for accounting-related data to be maintained on a hash chain in an order that is more suited to the way in which data is accessed on hash chains (e.g., in reverse order). Furthermore, summary chains as described herein may allow for data that is maintained on a plurality of different hash chains to be summarized in a single location to allow for more integrated and efficient access to the data for analysis and auditing purposes. Techniques described herein allow for the benefits of storing data in hash chains to be achieved (e.g., trustworthiness, transparency, and the like) while overcoming certain disadvantages to conventional means of storing data in hash chains (e.g., the inefficiency of analyzing data by repeatedly traversing the entirety of chains that grow indefinitely).

Example Computing Environment

FIG. 1 depicts an example computing environment 100 in which embodiments of the present disclosure may be implemented.

Computing environment 100 comprises distributed systems 120 and 130, a management device 140, and a device 150, all of which are connected over a network 110 (e.g., the Internet). Distributed systems 120 and 130 may each comprise one or more physical or virtual computing devices, such as servers, desktop computers, laptop computers, portable electronic devices, or the like. Distributed system 120 comprises a plurality of blocks 122a-n that store data 124. Blocks 122a-n may, for example, comprise a hash chain. In some instances, data 124 may comprise data associated with one or more applications, such as application 152 on device 150. For example, data 124 may be accounting-related data associated with users of application 152.

Distributed system 130 comprises a plurality of summary blocks 132a-n that store summary data 134. For example, summary data 134 may comprise the results of applying a summary function to periodic subsets of data 124 (e.g., by block manager 142). A periodic subset of data may, for example, comprise data that is stored in blocks added to distributed system 120 within a summary period.

Management device 140 may comprise a physical or virtual computing device, such as a server, desktop computer, laptop computer, portable electronic device, or the like, which performs functions related to management of data stored in hash chains. As depicted in FIG. 1, management device 140 comprises a block manager 142, which performs operations related to management of blocks 122a-n and summary blocks 132a-n on distributed systems 120 and 130. In some embodiments, block manager 142 receives and responds to all requests for data maintained in distributed systems 120 and 130 from outside entities (e.g., application 152).

A summary period may be configured that identifies when periodic summary operations should be performed, for instance, by block manager 142. For example, block manager 142 may determine that the summary period has elapsed by identifying that a time, block, or data threshold has been reached. Each time the summary period elapses, block manager 142 may apply a summary function to blocks added to distributed system 120 during the summary period. Block manager 142 may determine which blocks were added to distributed system 120 during the summary period by iterating from the end of the chain to the last block previously summarized (e.g., determined based on a hash stored in the last summary block or, if no summary blocks have been generated yet, iterating to the beginning of the chain). Block manager 142 may generate an ordered list comprising the hashes of the blocks that were added to distributed system 120 during the summary period, and may provide the ordered list to the summary function as an input. In another embodiment, block manager 142 may add the blocks to the ordered list rather than the hashes of the blocks. In yet another embodiment, the summary function may take one or more blocks as an input rather than an ordered list, and block manager 142 may provide the blocks as a stream of data directly to the summary function rather than generating an ordered list to provide to the summary function. The summary function may provide summary data as an output, and block manager 142 may generate a summary block comprising the summary data. Block manager 142 may then append the summary block to the tail of a summary chain. For example, block manager 142 may append summary block 132n to distributed system 130. Each summary block may contain a hash of the last block on distributed system 120 that is summarized by the summary block. For example, if summary block 132a summarizes data 124 from blocks 122a-c, then the hash from block 122c will be stored in summary block 132a. Application 152 may then access distributed system 130 in order to retrieve summary data 134 for analysis or auditing purposes.

Generating an ordered list may involve traversing distributed system 120 starting at the end, and adding each block 122 within the summary period to the ordered list in the order in which it is accessed. Block manager 142 may, for example, access the summary chain (e.g., on distributed system 130), and retrieve the hash stored in the last summary block on the chain in order to identify the last block on distributed system 120 that was previously summarized. Block manager 142 may then set a pointer to the end of distributed system 120 (e.g., block 122n), and add that block to the ordered list. Block manager 142 may then determine whether the hash of the previous block on the chain (e.g., block 122n-1) matches the hash retrieved from the last summary block. If the hashes match, then the ordered list is complete, as all of the blocks that have not previously been summarized have been added to the list. If the hashes do not match, block manager 142 may move the pointer to the previous block (e.g., block 122n-1), and add that block to the ordered list. This process may be repeated until either the hash from the last summary block is reached on the chain or the beginning of the chain is reached. Once the ordered list has been generated, block manager 142 may provide it as an input to the summary function.

The summary function may be defined in advance, and may produce summary data based on an ordered list of blocks provided as an input. Alternatively, the summary function may receive blocks directly as an input (e.g., as a stream of data provided by block manager 142), rather than receiving an ordered list of blocks as an input. Generally, the summary function summarizes data stored in the blocks identified in an ordered list. In one example, the summary function calculates a summation of all sales recorded in the data and returns the summation as summary data. In another example, the summary function returns a chain comprising the blocks in a reverse order from the order in which they are stored in distributed system 120.

Device 150 may comprise a physical or virtual computing device, such as a desktop or laptop computer, mobile device, or the like, which runs an application 152. In some embodiments, application 152 may be representative of a component of a client server application (or other distributed application), which can communicate with management device 140 and distributed systems 120 and 130 over network 110. In certain embodiments, application 152 may be a software application (e.g., an accounting application) installed on device 150, and may communicate with the distributed systems 120 and 130 over network 110 in order to store, manage, and request data 124 and summary data 134 stored in blocks 122a-n and 132a-n, respectively.

In one embodiment, application 152 communicates with management device 140 at run-time (e.g., over network 110 using a protocol such as TCP/IP). For example, application 152 may store its associated application data as data 124. Application data may, for example, comprise data associated with the execution of application 152, such as accounting-related data. For example, block 122a may comprise a record of a first financial transaction involving a sale; block 122b may comprise a record of a second financial transaction involving a return; block 122c may comprise a third financial transaction involving a sale; and so on. Application 152 may then access application data as needed during execution (e.g., when application 152 is first launched, it may request the state of all of its application data from distributed system 120). In some embodiments requests directed to the hash chain from application 152 are handled by block manager 142 on management device 140, which may route requests to appropriate nodes. As described above, block manager 142 may perform periodic summary operations on blocks 122a-n, producing summary blocks 132a-n.

Application 152 may request summary data 134 in order to perform an analysis or audit of its data that is stored in distributed system 120. Analyses or audits may, for instance, be performed automatically at predetermined time intervals, or may be initiated by a user of application 152. In one example, upon initiating an analysis or audit operation, application 152 may send a request for summary data 134 to the hash chain, which may be received and handled by block manager 142. Block manager 142 may retrieve summary data 134 and return it to application 152, which may use the summary data 134 to perform an analysis or audit. For example, application 152 may use summary data 134 to analyze sales numbers and verify accounting records. Alternatively, application 152 may display the summary data 134 to a user for analysis or auditing purposes. In some cases, if additional information is needed, application 152 may also request data 124 from distributed system 120 in order to perform a more detailed analysis or audit.

Figure 2:
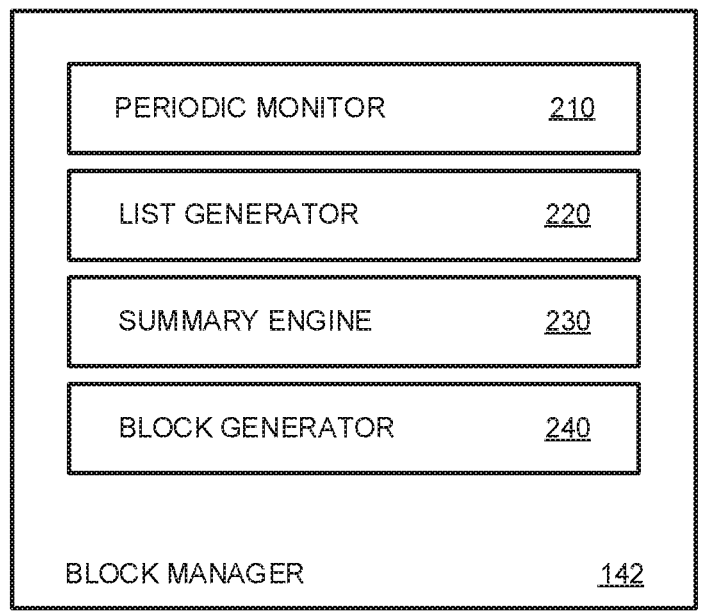
FIG. 2 depicts example components of a block manager.

FIG. 2 depicts example components of a block manager 142, according to embodiments of the present disclosure. As depicted, block manager 142 comprises a periodic monitor 210, a list generator 220, a summary engine 230, and a block generator 240. Each of these components performs functions related to managing data in hash chains. While certain components are described as performing certain operations, it is understood that other arrangements are possible.

Periodic monitor 210 stores a predetermined summary period which may, for example, specify a summary threshold which is used to determine when the summary period has elapsed. It is noted that the terms "period" and "periodic" are not necessarily defined by the passage of time, and that periods may also be defined by the occurrence of certain events, such as a certain number of blocks being added to the hash chain. Periodic monitor 210 may monitor conditions defined in the summary period in order to determine when the summary period has elapsed, such as when a summary threshold is reached. For example, periodic monitor 210 may monitor the passage of time in order to determine when a summary threshold has been reached. In another example, if the summary period is a number of blocks added to the chain, the summary threshold may indicate the number of blocks, and periodic monitor 210 may monitor the addition of blocks to the chain in order to determine when the summary threshold is reached. When periodic monitor 210 determines that the summary period has elapsed, it may notify other components (e.g., list generator 220) that a summary operation should be performed, and may continue monitoring for the next occurrence of the summary threshold.

List generator 220 may generate an ordered list comprising the hashes of blocks (or the blocks themselves) that were added to a hash chain during a summary period. For example, list generator 220 may traverse the hash chain starting at the end and moving to the beginning of the chain or before the last block that was previously summarized, adding the hash of each block (or the entire block) to the ordered list in the order in which the blocks are accessed. List generator 220 may then provide the ordered list to summary engine 230.

Summary engine 230 generally applies a summary function to the ordered list or to the blocks it receives as an input. When the input is an ordered list of block hashes, the summary function may return summary data of the payload data of the blocks corresponding to the block hashes as an output. For example, the summary function may retrieve the blocks associated with each block hash included in the ordered list and perform one or more calculations or operations on the payload data of the blocks in order to generate summary data. When the input is an ordered list of blocks or when the blocks are provided directly as an input, the summary function performs one or more calculations or operations on the payload data of the blocks in order to generate the summary data. Summary engine 230 may then provide the summary data to block generator 240.

Block generator 240 may generate a summary block comprising summary data received from summary engine 230. Block generator 240 may include a hash from the last block summarized from the hash chain in the summary block. It is noted that the last block summarized from the hash chain is generally the block which comprises the end of the hash chain at the time the summary block is generated. Block generator 240 may determine whether a summary chain currently exists, and if so, append the summary block to the end of the summary chain, adding a pointer to the previous block on the summary chain to the summary block. If a summary chain does not yet exist, block generator 240 may generate a summary chain and add the summary block as the first block of the summary chain.

Example Computer-Implemented Method

Figure 3:
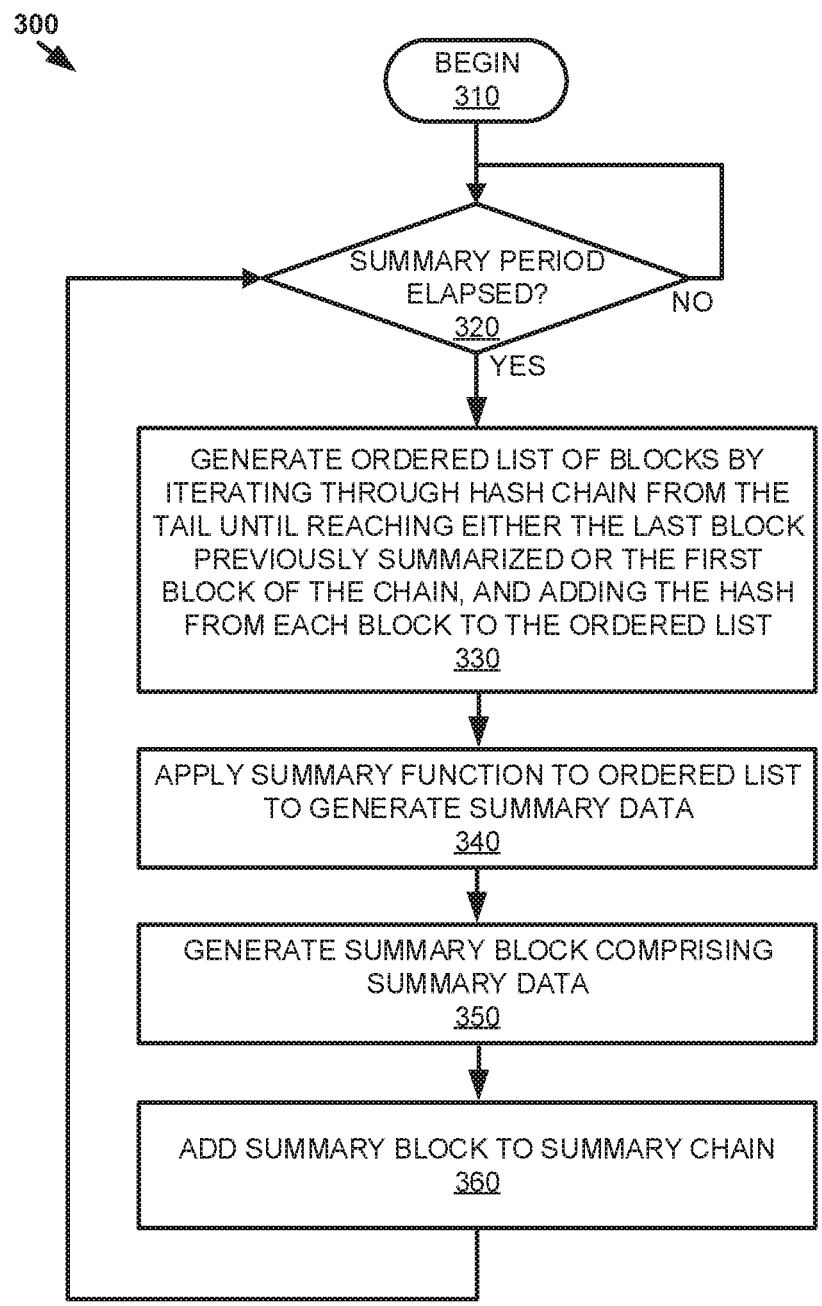
FIG. 3 depicts example operations for summarizing data in distributed systems.

FIG. 3 depicts example operations 300 for summarizing data in a distributed system, according to certain embodiments. Operations 300 may, for instance be performed by block manager 142 of FIGS. 1 and 2.

Operations 300 begin at step 310, and proceed to step 320, where a determination is made regarding whether a summary period has elapsed. Determining whether a summary period has elapsed may involve determining if a summary threshold has been reached. For example a summary threshold may define an amount of time, a number of blocks added to the chain, an amount of data added to the chain, or the like. If the summary period has not elapsed, operations remain at step 320. When the summary period has elapsed, operations proceed to step 330.

At step 330, an ordered list of blocks is generated by iterating through a hash chain maintained in a distributed system, starting at the last block in the chain and ending either before the last block that was previously summarized or at the first block in the chain, and adding the hash from each block to the ordered list in the order in which the blocks are accessed. For example, a hash stored in the last summary block of a summary chain may be used to determine the last block on the hash chain that was summarized. It is noted that, while operations 300 depict an ordered list of block hashes, in other embodiments the blocks themselves may be directly added to the ordered list. Alternatively, the blocks may be provided directly to the summary function as input data rather than being added to an ordered list.

At step 340, a summary function is applied to the ordered list to generate summary data. The summary function may take the ordered list as an input, and return the summary data as an output. For example, the summary function may calculate a summation of accounting-related data stored in the payloads of blocks identified by hashes in the ordered list.

At step 350, a summary block is generated comprising the summary data. The summary block may also include a hash of the last block on the hash chain which was summarized. In some embodiments, if there is already at least one previous summary block on a summary chain, the summary block also includes a pointer to the previous block on the summary chain.

At step 360, the summary block is added to the summary chain. For example, the summary block may be appended to the tail of the summary chain. If a summary chain has not yet been generated, the summary block may be appended to the beginning of a new summary chain. Operations then return to step 320 so that summarization may be performed each time the summary period elapses. Thus, in this way, the summary chain may be used to perform efficient analysis or audits without requiring traversal of the full hash chain.

Figure 4A:
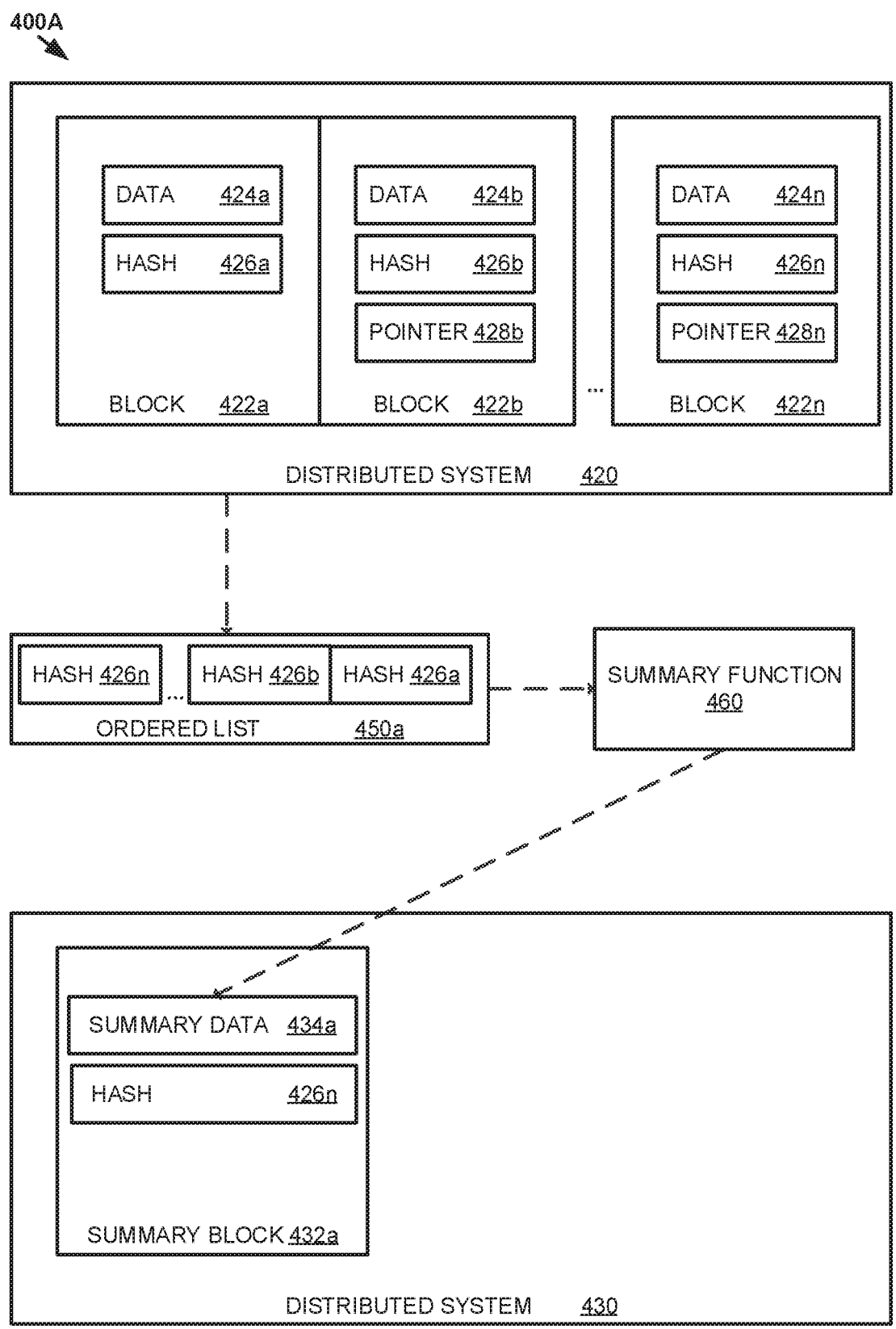
FIGS. 4A 4B, and 4C depict examples of periodically summarizing data in a hash chain.

FIG. 4A depicts an example 400A of summarizing data in a distributed system according to techniques described herein.

Distributed system 420 comprises a hash chain made up of a plurality of blocks 422a-n. Block 422a contains data 424a and a hash 426a (e.g., a hash of data 424a). Blocks 422b-n each comprise data 424b-n, a hash 426b-n (e.g., hashes of data 424b-n), and a pointer 428b-n to the previous block. Each item of data 424a-n may, for example, comprise data related to an application. In another embodiment, block 422a may have a pointer with a null value indicating that it is the first block in the hash chain.

As depicted, an ordered list 450a is generated (e.g., by block manager 142 of FIGS. 1 and 2) from distributed system 420, and comprises hashes 426n-a from blocks 422a-n. Ordered list 450a comprises hashes 426n-a in a reverse order of the order in which they appear in blocks 422a-n, as the ordered list 450a is generated by traversing the hash chain starting at the last block (here, block 422n), and moving towards the first block (here, 422a).

A summary period may define that a summary operation should be performed every time 'n' blocks are added to the hash chain. As such, the summary period elapsed when block 422n was added to the hash chain, and so the ordered list 450a includes the hashes of blocks 422a-n. Ordered list 450a is provided as an input to summary function 460, which generates summary data 434a based on the blocks identified in the ordered list. For example, summary function 460 may retrieve each of blocks 422n-a using hashes 426n-a, and may generate summary data 434a based on data 424n-a. In one example, summary function 460 involves calculating a summation of accounting-related data included in data 424n-a (e.g., a summation of all sales recorded on the hash chain during the summary period).

The output of summary function 460 is summary data 434a and is included within a summary block 432a, which is the first block of a summary chain on distributed system 430. In certain embodiments, summary block 432a and the summary chain of distributed system 430 are generated by block manager 142 of FIGS. 1 and 2. As depicted, summary block 432a also comprises hash 426n, which is the hash of the last block summarized from the hash chain. In this case, block 422n is the last block summarized on the hash chain, and so its hash 426n is included within summary block 432a so that it may be used in future summary operations to determine a stopping point for generating new ordered lists.

Figure 4B:
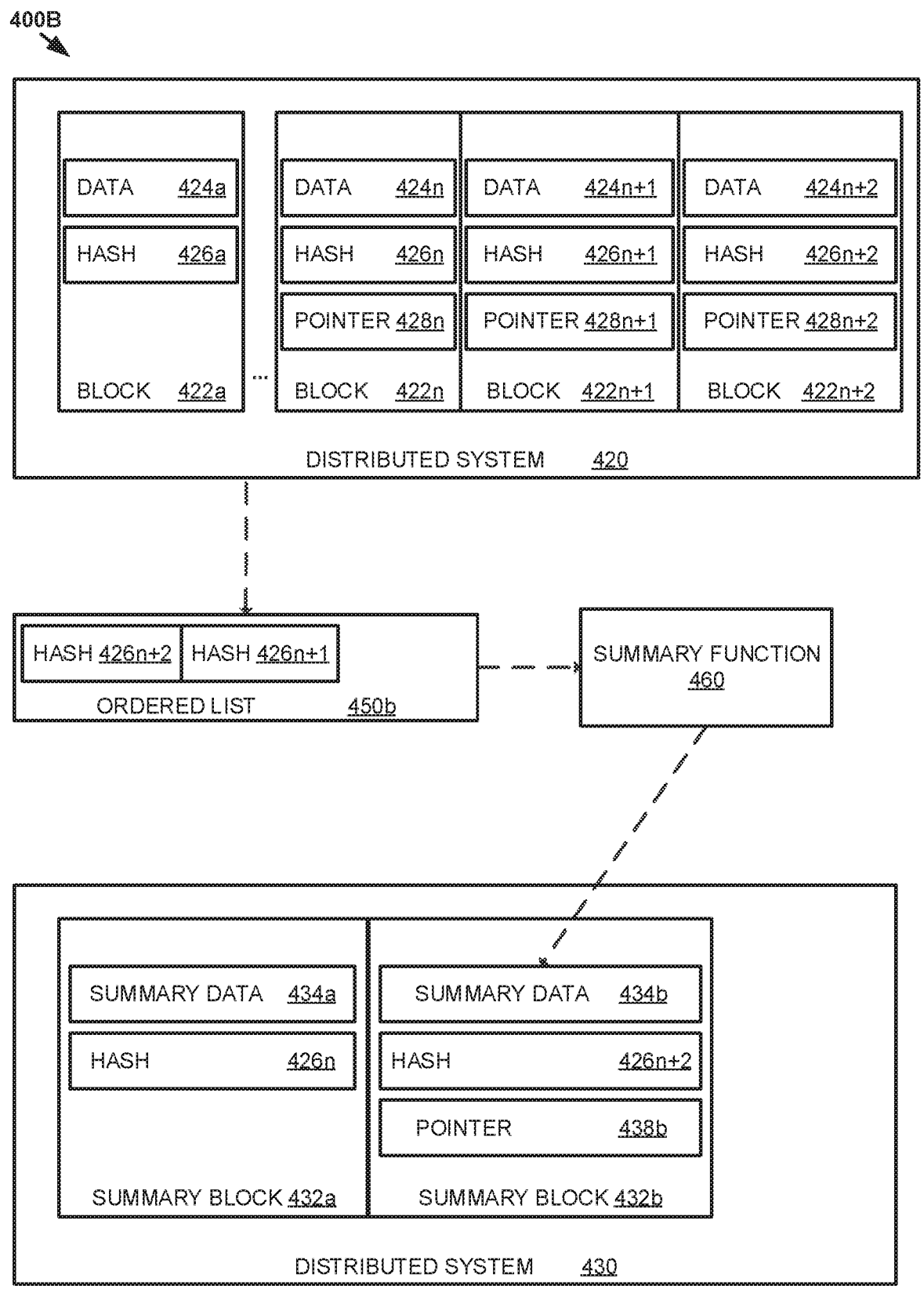

FIG. 4B depicts an example 400B of continuing the summarization of data in the distributed system depicted in FIG. 4A. Example 400B may occur after a summary period has elapsed following example 400A in FIG. 4A.

As depicted, blocks 422n+1 and 422n+2 have been added to distributed system 420 since example 400A. Each of blocks 422n+1 and 422n+2 comprise data 424n+1 and 424n+2, a hash 426n+1 and 426n+2, and a pointer 428n+1 and 428n+2 to the previous respective blocks.

Ordered list 450b is generated based on distributed system 420 by iterating through the hash chain starting at the last block, which is block 422n+2, and ending before the last block previously summarized, which is block 422n. For example, the last block that was previously summarized may be determined by retrieving the hash 426n from the last summary block 432a. When iterating through the hash chain on distributed system 420, it may be determined based on the pointer 428n+1 that the previous block 422n comprises hash 426n, which matches hash 426n retrieved from summary block 432a. As such, the ordered list 450b will end with hash 426n+1 from block 422n+1 so that no blocks are considered more than once in any type of summary.

Ordered list 450b is then provided as an input to summary function 460, which provides summary data 434b as an output. Summary data 434b is included within a new summary block 432b, which is appended to the end of the summary chain of distributed system 430. As depicted, summary block 432b also includes the hash 426n+2 of the last block summarized from the hash chain on distributed system 420, which is block 422n+2. Summary block 432b also comprises a pointer 438b to the previous summary block on the summary chain, which is summary block 432a.

Figure 4C:
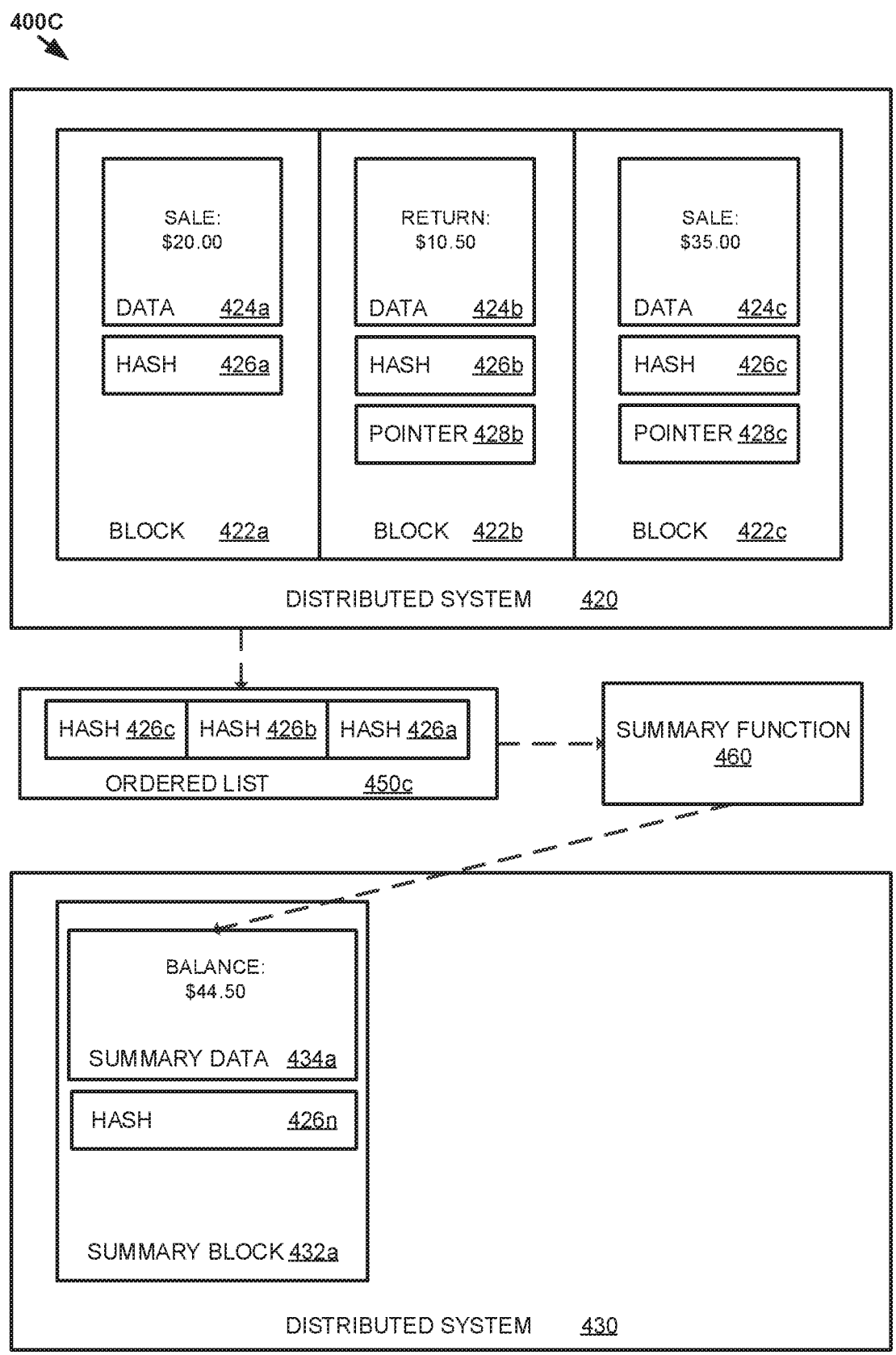

FIG. 4C depicts an example 400C of summarizing accounting data in a distributed system. Distributed systems 420 and 430 are generally described above with respect to FIGS. 4A and 4B.

As depicted, data 424a-c in blocks 422a-c comprises a series of financial transactions. For example, data 424a-c may be representative of sales and returns recorded by a retail establishment within a period of time. Data 424a comprises a record of a $20.00 sale, data 424b comprises a record of a $10.50 return, and data 424c comprises a record of a $35.00 sale.

Ordered list 450c comprises hashes 426c, 426b, and 426a, and is provided as an input to summary function 460. In this example, summary function 460 calculates a balance based on the series of credits and debits (e.g., sales and returns) in blocks 422a-c, which it retrieves using the hashes in the ordered list. Summary data 434a in summary block 432a on distributed system 430 comprises the output of summary function 460. As shown, summary data 434a includes a balance of $44.50 (e.g., $20.00-$10.50+$35.00).

The retail establishment may wish to periodically analyze its sales balance, and summary blocks such as summary block 432a on distributed system 430 may allow for this information to be efficiently retrieved and analyzed without requiring traversal of the entire hash chain stored on distributed system 420. While example 400c is simple, and involves summarizing data stored in three blocks, it is understood that techniques described herein may become increasingly advantageous as hash chains grow in size.

Distributed system 420 may, for example, be analogous to the first entry in double-entry accounting, and distributed system 430 may be analogous to the second entry. Because distributed systems 420 and 430 comprise cryptographic links and are resistant to modification, techniques described herein provide a higher level of security for accounting records than do conventional record keeping systems. As such, embodiments of the present disclosure may reduce fraud in accounting, and in some cases may allow for efficient public access to accounting records for transparency.

It is noted that, while the examples described with respect to FIGS. 4a-c include an ordered list of block hashes, in other embodiments the blocks themselves may be directly added to the ordered list. Alternatively, the blocks may be provided directly to the summary function as input data rather than being added to an ordered list.

Figure 5:
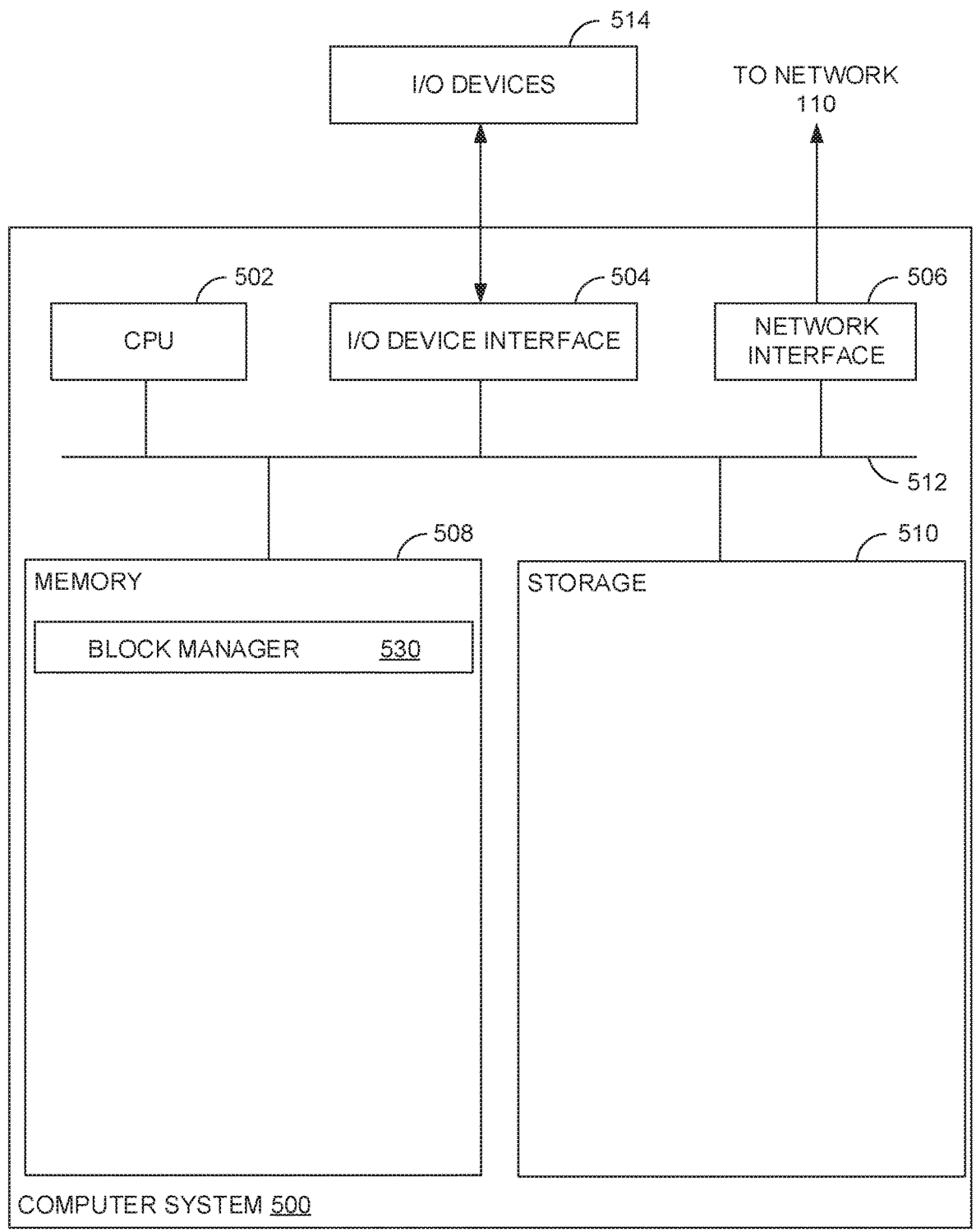
FIG. 5 depicts an example computing system with which embodiments of the present disclosure may be implemented.

FIG. 5 illustrates an example computer system 500 used for isolating data in distributed hash chains, according to embodiments of the present disclosure. For example, computer system 500 may be representative of a management device 140 in FIG. 1. As shown, the system 500 includes a central processing unit (CPU) 502, one or more I/O device interfaces 504 which may allow for the connection of various I/O devices 514 (e.g., keyboards, displays, mouse devices, pen input, etc.) to the system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 508 is included to be representative of a random access memory. Furthermore, the storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a block manager 530, which may comprise a component (e.g., local or distributed) which manages data maintained in distributed systems (e.g., functionality described above with respect to FIGS. 1-4B). Block manager 530 may employ techniques for summarizing data stored in hash chains as described herein. Block manager 530 in memory 508 may communicate with other devices (e.g., other nodes, management device 140, and device 150) over network 110 through network interface 506 (e.g., in order to store, access, summarize, analyze, distribute, and otherwise process data).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

What is claimed is:

1. A computer-implemented method for summarizing data, comprising:
    generating summary data by applying a summary function to a first group of blocks, wherein the summary function takes a list of the first group of blocks as an input and provides the summary data of the first group of blocks as an output;
    generating a summary block comprising the summary data;
    adding the summary block to a summary chain;
    determining that a periodic threshold has been met, wherein the periodic threshold comprises one of: a time period; a number of blocks added to a chain; an amount of data added to the chain; or a value of a variable stored in the chain;

generating new summary data by applying the summary function to a second group of blocks, wherein the summary function takes a new list of the second group of blocks as input data and provides the new summary data of the second group of blocks as output data;

generating a new summary block comprising the new summary data and a pointer to the summary block; and adding the new summary block to the summary chain.

2. The computer-implemented method of claim 1, further comprising: performing an audit of the data, wherein performing the audit comprises iterating through the summary chain.

3. The computer-implemented method of claim 2, further comprising:

determining, based on the audit, that additional analysis is needed; and performing an additional audit of the data, wherein performing the additional audit comprises iterating through a chain comprising the first group of blocks and the second group of blocks.

4. The computer-implemented method of claim 1, wherein the summary function comprises one or more of: a summation; a balance calculation; and a net change.

5. The computer-implemented method of claim 1, wherein applying the summary function comprises:

generating a periodic chain comprising the first group of blocks in a reverse order from an order in which they are stored on an existing chain; and returning the periodic chain as the summary data.

6. The method of claim 1, wherein the list of the first group of blocks and the new list of the second group of blocks are ordered lists.

7. A system comprising: one or more processors; and a memory comprising instructions that, when executed by the one or more processors, cause the system to perform a method for summarizing data in a distributed system, the method comprising:

generating summary data by applying a summary function to a first group of blocks, wherein the summary function takes a list of the first group of blocks as an input and provides the summary data of the first group of blocks as an output;

generating a summary block comprising the summary data;

adding the summary block to a summary chain;

determining that a periodic threshold has been met, wherein the periodic threshold comprises one of: a time period; a number of blocks added to a chain; an amount of data added to the chain; or a value of a variable stored in the chain;

generating new summary data by applying the summary function to a second group of blocks, wherein the summary function takes a new list of the second group of blocks as input data and provides the new summary data of the second group of blocks as output data;

generating a new summary block comprising the new summary data and a pointer to the summary block; and adding the new summary block to the summary chain.

8. The system of claim 7, wherein the method further comprises: performing an audit of the data, wherein performing the audit comprises iterating through the summary chain.

9. The system of claim 8, wherein the method further comprises:

determining, based on the audit, that additional analysis is needed; and performing an additional audit of the data, wherein performing the additional audit comprises iterating through a chain comprising the first group of blocks and the second group of blocks.

10. The system of claim 7, wherein the summary function comprises one or more of: a summation; a balance calculation; and a net change.

11. The system of claim 7, wherein applying the summary function comprises:

generating a periodic chain comprising the first group of blocks in a reverse order from an order in which they are stored on an existing chain; and returning the periodic chain as the summary data.

12. The system of claim 7, wherein the list of the first group of blocks and the new list of the second group of blocks are ordered lists.

13. A computer-implemented method for summarizing data, comprising:

generating summary data by applying a summary function to a first group of blocks of a chain, wherein the summary function takes a list of the first group of blocks as an input and provides the summary data of the first group of blocks as an output;

generating a summary block comprising the summary data;

adding the summary block to a summary chain;

determining that a periodic threshold has been met, wherein the periodic threshold comprises one of: a time period; a number of blocks added to a chain; an amount of data added to the chain; or a value of a variable stored in the chain;

generating new summary data by applying the summary function to a second group of blocks, wherein the summary function takes a new list of the second group of blocks as input data and provides the new summary data of the second group of blocks as output data, and wherein the second group of blocks was added to the chain after the first group of blocks;

generating a new summary block comprising the new summary data and a pointer to the summary block; and adding the new summary block to the summary chain.

14. The computer-implemented method of claim 13, further comprising: performing an audit of the data, wherein performing the audit comprises iterating through the summary chain.

15. The computer-implemented method of claim 14, further comprising:

determining, based on the audit, that additional analysis is needed; and performing an additional audit of the data, wherein performing the additional audit comprises iterating through the chain.

16. The computer-implemented method of claim 13, wherein the summary function comprises one or more of: a summation; a balance calculation; and a net change.

17. The computer-implemented method of claim 13, wherein applying the summary function comprises:

generating a periodic chain comprising the first group of blocks in a reverse order from an order in which they are stored on the chain; and returning the periodic chain as the summary data.

* * * * *